US006862613B1

(12) United States Patent
Kumar et al.

(10) Patent No.: US 6,862,613 B1
(45) Date of Patent: Mar. 1, 2005

(54) METHOD AND APPARATUS FOR MANAGING OPERATIONS OF CLUSTERED COMPUTER SYSTEMS

(75) Inventors: Krishna Kumar, Cupertino, CA (US); Declan J. Murphy, San Francisco, CA (US); Andrew L. Hisgen, Cupertino, CA (US); Robert Block, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/480,785

(22) Filed: Jan. 10, 2000

(51) Int. Cl.[7] ............................................. G06F 15/177
(52) U.S. Cl. ...................... 709/220; 709/221; 709/202; 709/224; 709/226; 714/4; 714/11; 714/13; 714/22
(58) Field of Search ................... 709/221, 202, 709/224, 226, 220; 714/4, 11, 22, 13

(56) References Cited

U.S. PATENT DOCUMENTS

| 4,817,091 A | * | 3/1989 | Katzman et al. ................ 714/8 |
| 5,283,783 A | | 2/1994 | Nguyen et al. |
| 5,459,857 A | | 10/1995 | Ludlam et al. |

(List continued on next page.)

FOREIGN PATENT DOCUMENTS

| EP | 0 817 444 A2 | 1/1998 |
| EP | 0 865 180 A2 | 9/1998 |
| WO | 98/26559 | 6/1998 |
| WO | 99/33227 | 7/1999 |

OTHER PUBLICATIONS

Charles E. Stroud, "Yield Modeling for Majority Based Defect–Tolerant VLSI Circuits", Southeastcon '00, Proceedings IEEE, Mar. 1999, pp. 229–236.*
Foresti, G.L., Regazzoni, Cl., "A Hierarchical Approach to Feature Extraction and Grouping", Image Processing, IEEE Transactions on, vol. 9, issue 6, Jun. 2000, pp. 1056–1074.*
Fox, Armando et al.,"Cluster–based Scalable Network Services", ACM Symposium on Operating Systems Principles, Proceedings of the sixteenth ACM symposium on Operating systems principles,ACM Press, New York, NY 1997, pp 78–91.*
Zhou, Yuanyuan et al., Fast Cluster Failover Using Virtual Memory–Mapped Communication, International Conference on Supercomputing, Proceedings of the 13th international conference on Supercomputing, ACM Press, New York, NY, 1999, pp. 373–382.*
Goldszmidt "Load Management for Scaling up Internet Services", IEEE0–7803–4351/4/98, pp. 828–835.
Hung et al., "Network dispatcher: a connection router for scalable Internet services", Computer Networks and ISDN Systems, 30(1998) 347–357.

(List continued on next page.)

Primary Examiner—Hosain Alam
Assistant Examiner—Shabana Qureshi
(74) Attorney, Agent, or Firm—Beyer Weaver & Thomas LLP

(57) ABSTRACT

Improved techniques for managing operations of clustered computing system are disclosed. The improved techniques provide protection against potential problems encountered in operation of clustered computing. More particularly, the improved techniques can be implemented as an integral solution that provide protection against undesired partitions in space and partitions in time. The improved techniques do not require any human intervention.

28 Claims, 9 Drawing Sheets

U.S. PATENT DOCUMENTS

| | | | |
|---|---|---|---|
| 5,687,308 A | * | 11/1997 | Jardine et al. ............ 714/4 |
| 5,774,660 A | | 6/1998 | Brendel et al. |
| 5,790,772 A | | 8/1998 | Badovinatz et al. |
| 5,822,531 A | | 10/1998 | Gorczyca et al. |
| 5,890,014 A | | 3/1999 | Long |
| 5,909,540 A | | 6/1999 | Carter et al. |
| 5,918,017 A | | 6/1999 | Attanasio et al. |
| 5,938,732 A | | 8/1999 | Lim et al. |
| 5,964,838 A | | 10/1999 | Cheung et al. |
| 5,964,886 A | | 10/1999 | Slaughter et al. |
| 5,991,518 A | | 11/1999 | Jardine et al. |
| 5,996,001 A | | 11/1999 | Quarles et al. |
| 6,002,851 A | | 12/1999 | Basavaiah et al. |
| 6,003,075 A | | 12/1999 | Arendt et al. |
| 6,097,882 A | | 8/2000 | Mogul |
| 6,108,699 A | | 8/2000 | Moiin |
| 6,185,619 B1 | | 2/2001 | Joffe et al. |
| 6,192,483 B1 | | 2/2001 | Moiin et al. |
| 6,195,680 B1 | | 2/2001 | Goldszmidt et al. |
| 6,219,786 B1 | | 4/2001 | Cunningham et al. |
| 6,226,684 B1 | | 5/2001 | Sung et al. |
| 6,243,744 B1 | * | 6/2001 | Snaman et al. ........... 709/220 |
| 6,247,141 B1 | | 6/2001 | Holmberg |
| 6,256,675 B1 | | 7/2001 | Rabinovich |
| 6,304,980 B1 | | 10/2001 | Beardsley et al. |
| 6,363,077 B1 | | 3/2002 | Wong et al. |
| 6,363,495 B1 | * | 3/2002 | MacKenzie et al. ........ 714/4 |
| 6,424,992 B2 | | 7/2002 | Devarakonda et al. |
| 6,427,163 B1 | | 7/2002 | Arendt et al. |
| 6,438,652 B1 | | 8/2002 | Jordan et al. |
| 6,438,705 B1 | * | 8/2002 | Chao et al. ............... 714/4 |
| 6,445,709 B1 | | 9/2002 | Chiang |
| 6,453,426 B1 | | 9/2002 | Gamache et al. |
| 6,470,389 B1 | | 10/2002 | Chung et al. |
| 6,532,494 B1 | | 3/2003 | Frank et al. |
| 6,587,860 B1 | * | 7/2003 | Chandra et al. .......... 707/202 |
| 2003/0088458 A1 | * | 5/2003 | Afeyan et al. ........... 705/10 |

OTHER PUBLICATIONS

Lamport, "A New Solution of Dijkstra's Concurrent Programming Problem," Aug. 1974, Communications of the ACM, vol. 17, No. 8, pp 453–455.

Preslan et al., "Device Locks: Mutual Exclusion for Storage Area Networks," Mar. 15, 1999, IEEE.

Soltis et al., "The Design and Performance of a Shared Disk File System for IRIX," Mar. 23, 1998, Sixth NASA Goddard Space Center Conference on Mass Storage and Technologies.

VanHalderen et al., "Hierarchical resource management in the Polder metacomputing Initiative", (11/98) Parallel Computing, NL/Elsevier Science Publ., Amsterdam. vol. 24, No. 12–13, pp. 1807–1825.

Chang et al., "An ordered and reliable broadcast protocol for distributed systems", (7/97) Computer Comm., NL/Elsevier Science Publ., Amsterdam, vol. 20, No. 6, pp. 487–499.

Scheible, "Information Technology, Serial Storage Architecture–SCSI–3 Protocol (SSA–S3P)," Rev. 5b, Apr. 1997.

* cited by examiner

METHOD AND APPARATUS FOR MANAGING OPERATIONS OF CLUSTERED COMPUTER SYSTEMS

CROSS-REFERENCE TO RELATED APPLICATIONS

This application is related to the following applications, filed concurrently herewith and incorporated herein by reference: (1) U.S. patent application Ser. No. 09/480,466, entitled "METHOD AND APPARATUS FOR DYNAMICALLY ALTERING CONFIGURATIONS OF CLUSTERED COMPUTER SYSTEMS"; (2) U.S. patent application Ser. No. 09/479,485, entitled "CONTROLLED TAKE OVER OF SERVICES BY REMAINING NODES OF CLUSTERED COMPUTING SYSTEM"; (3) U.S. patent application Ser. No. 09/479,468, entitled "METHOD AND APPARATUS FOR RESOLVING PARTIAL CONNECTIVITY IN A CLUSTERED COMPUTING SYSTEM"; (4) U.S. patent application Ser. No. 09/480,330, now U.S. Pat. No. 6,748,429, entitled "METHOD TO DYNAMICALLY CHANGE CLUSTER OR DISTRIBUTED SYSTEM CONFIGURATION"; and (5) U.S. patent application Ser. No. 09/480,329, entitled "EMULATION OF PERSISTANT GROUP RESERVATIONS".

BACKGROUND OF THE INVENTION

1. Field of the Invention

The present invention relates to computer systems and, more particularly, to improved methods and apparatus for managing operations of clustered computer systems.

2. Description of the Related Art

In contrast to single mainframe computing models of the past, more distributed computing models have recently evolved. One such distributed computing model is known as a clustered computing system. FIG. 1 illustrates an exemplary clustered computing system 100 including computing nodes (nodes) A, B and C, storage devices (e.g., storage disks 102–104), and other computing devices 106–110 representing other devices such as scanners, printers, digital cameras, etc. For example, each of the nodes A, B and C can be a computer with its own processor and memory. The collection of nodes A, B and C, storage disks 102–104, and other devices 106–110 make up the clustered computing system 100.

Typically, the nodes in a cluster are coupled together through a "private" interconnect with redundant pathways. As shown in FIG. 1, nodes A, B and C are coupled together through private communication channels 112 and 114. For example, the private communication channels 112 and 114 can adhere to Ethernet, ATM, or Scalable Coherent Interconnect (SCI) standards. A client 116 can communicate with the clustered computing system 100 via a network 118 (e.g., public network) using a variety of protocols such as Transmission Control Protocol (TCP), User Datagram Protocol (UDP), etc. From the point of view of the client 116, the clustered computing system 100 is a single entity that can provide the client 116 with a variety of computer-implemented services, e.g., web-hosting, transaction processing, etc. In other words, the client 116 is not aware of which particular node(s) of the clustered computing system 100 is (are) providing service to it.

The clustered computing system 100 provides a scalable and cost-efficient model where off-the-shelf computers can be used as nodes. The nodes in the clustered computing system 100 cooperate with each other to provide a distributed computing model that is transparent to users, e.g., the client 116. In addition, in comparison with single mainframe computing models, the clustered computing system 100 provides improved fault tolerance. For example, in case of a node failure within the clustered computing system 100, other nodes can take over to perform the services normally performed by the node that has failed.

Typically, nodes in the clustered computing system 100 send each other "responsive" (often referred to as "heartbeat" or activation) signals over the private communication channels 112 and 114. The responsive signals indicate whether nodes are active and responsive to other nodes in the clustered computing system 100. Accordingly, these responsive signals are periodically sent by each of the nodes so that if a node does not receive the responsive signal from another node within a certain amount of time, a node failure can be suspected. For example, in the clustered computing system 100, if nodes A and B do not receive a signal from node C within an allotted time, nodes A and B can suspect that node C has failed. In this case, if nodes A and B are still responsive to each other, a two-node sub-cluster (AB) results. From the perspective of the sub-cluster (AB), node C can be referred to as a "non-responsive" node. If node C has really failed then it would be desirable for the two-node sub-cluster (AB) to take over services from node C. However, if node C has not really failed, taking over the services performed by node C could have dire consequences. For example, if node C is performing write operations to the disk 104 and node B takes over the same write operations while node C is still operational, data corruption can result.

It should be noted that the fact that nodes A and B have not received responsive signals from node C does not necessarily mean that node C is not operational with respect to the services that are provided by node C. Other events can account for why responsive signals for node C have not been received by nodes A and B. For example, the private communication channels 112 and 114 may have failed. It is also possible that node C's program for sending responsive signals may have failed but node C is fully operational with respect to the services that it provides. Thus, it is possible for the clustered computing system 100 to get divided into two or more functional sub-clusters wherein the sub-clusters are not responsive to each other. This situation can be referred to as a "partition in space" or "split brain" where the cluster no longer behaves as a single cohesive entity. In this and other situations, when the clustered computing system no longer behaves as a single cohesive entity, it can be said that the "integrity" of the system has been compromised.

In addition to partitions in space, there are other potential problems that need to be addressed in managing the operation of clustered computing systems. For example, another potential problem associated with operating clustered computing systems is referred to as a "partition in time" or "amnesia." As is known to those skilled in the art, partitions in time can occur when a clustered computing system is operated with cluster configurations that vary over time. To facilitate understanding, consider the situation where the clustered computing system 100 of FIG. 1 is operating without node C, (only nodes A and B have been started and are operational). In this situation, if a configuration change is made to the clustered computing system 100, configuration information which is typically kept for each node is updated. Typically, such configuration information is stored in a Cluster Configuration Repository (CCR). With respect to FIG. 1, each of the nodes A, B and C has a CCR 120, 122 and 124, respectively. In this case, configuration information for nodes A and B is updated by updating information stored in the CCR 118 and CCR 120 of nodes A and B, respectively. However, since node C is not operating in this example, the configuration information for node C would not be updated. Typically, when node C comes up again, the previously updated configuration information is communicated by other nodes (e.g., A or B) to node C so that the information stored in the CCR 124 can be updated. However, if node C comes up by itself (prior to having its node configuration information updated and in a cluster configuration that does not include any of the nodes A and B), the configuration information for node C does not get updated and, thus, is incorrect. In this situation, node C does not have the updated configuration information and the clustered computing system 100 can be said to be partitioned "in time".

To address potential problems such as partitions in time and space associated with operation of clustered computer systems, various solutions have been proposed and implemented in conventional approaches. Unfortunately, however, conventional approaches have relied on solutions that often require significant human intervention. For example, to avoid a partition in space, a human operator would have to intervene to determine if a non-responsive node is no longer operating. Similarly, human intervention would be required to keep track of different cluster configurations that are used to ensure that partitions in time do not occur.

Another problem is that conventional approaches often require and use many incongruent solutions that are implemented to account for many potential problems that may arise in operations of clustered computing systems. For example, conventionally it is common to use a particular solution for partitions in time and a different solution for partitions in space. In other words, the conventional approaches do not provide techniques that can be implemented as a consistent integral solution to avoid the various operational problems encountered in clustered computing systems.

In view of the foregoing, there is a need for improved methods for managing the operations of clustered computing systems.

SUMMARY OF THE INVENTION

Broadly speaking, the invention relates to improved techniques for managing operations of clustered computing systems. In one aspect, improved techniques can be implemented as an integral solution that provide protection against undesired partitions in space and partitions in time. The improved techniques do not require any human intervention.

The invention can be implemented in numerous ways, including a system, an apparatus, a method or a computer readable medium. Several embodiments of the invention are discussed below.

As a method for managing operation of a clustered computing system having a cluster of computing nodes, an embodiment of the invention includes the acts of: determining whether one of the computing nodes in the cluster has become a non-responsive node; determining a sub-cluster vote for a sub-cluster, the sub-cluster representing a portion of the cluster that remains responsive; obtaining a total votes for the clustered computing system; determining whether the sub-cluster vote is at least a majority of the total votes; and initiating shut down of the computing nodes within the sub-cluster when determining whether the sub-cluster vote is at least a majority of the total votes has determined that the sub-cluster vote is not at least a majority of the total votes.

Optionally, the method can further include the act of taking over services from the non-responsive node by at least one of the computing nodes in the sub-cluster when determining whether the sub-cluster vote is at least a majority of the total votes has determined that the sub-cluster vote is at least a majority of the total votes.

As a clustered computing system having a cluster of computing nodes, an embodiment of the present invention includes: at least two computing nodes, where each node is assigned a node vote; an integrity protector provided for each one of the computing nodes, where the integrity protector determines a vote count for a set of computing nodes in the cluster, the set of nodes representing at least a portion of the cluster, and the integrity protector determines whether the set of computing nodes should be shut down based on the vote count. Optionally, the cluster of computing nodes can further include a proxy device. The proxy device can be assigned a proxy vote which can be acquired by the integrity protector.

As a computer readable media including computer program code for managing operation of a clustered computing system having a cluster of computing nodes, an embodiment of the invention includes: computer program code for determining whether one of the computing nodes in the cluster has become a non-responsive node; computer program code for determining a sub-cluster vote for a sub-cluster, the sub-cluster representing a portion of the cluster that remains responsive; computer program code for obtaining a total votes for the clustered computing system; computer program code for determining whether the sub-cluster vote is at least a majority of the total votes; and computer program code for initiating shut down of the computing nodes within the sub-cluster when the computer program code for determining whether the sub-cluster vote is at least a majority of the total votes determines that the sub-cluster vote is not at least a majority of the total votes.

The invention has numerous advantages. One advantage is that the invention provides greater and more reliable protection against partitions in time or space which are unwanted conditions in clustered computing systems. Another advantage is that the invention protects the integrity of clustered computing systems without requiring any amount of human intervention as required by conventional solutions. Still another advantage is that the techniques of the invention can be implemented as an integral solution to avoid a wide variety of potential problems (including split brain and amnesia) that may occur in operations of clustered computing systems. Yet another advantage is that cost effective and not overly complicated implementations are possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for managing operations of clustered computing systems. The improved techniques provide protection against potential problems encountered in operation of clustered computing. More particularly, the improved techniques can be implemented as an integral solution that provide protection against undesired partitions in space and partitions in time. The improved techniques do not require any human intervention.

Figure 2A:
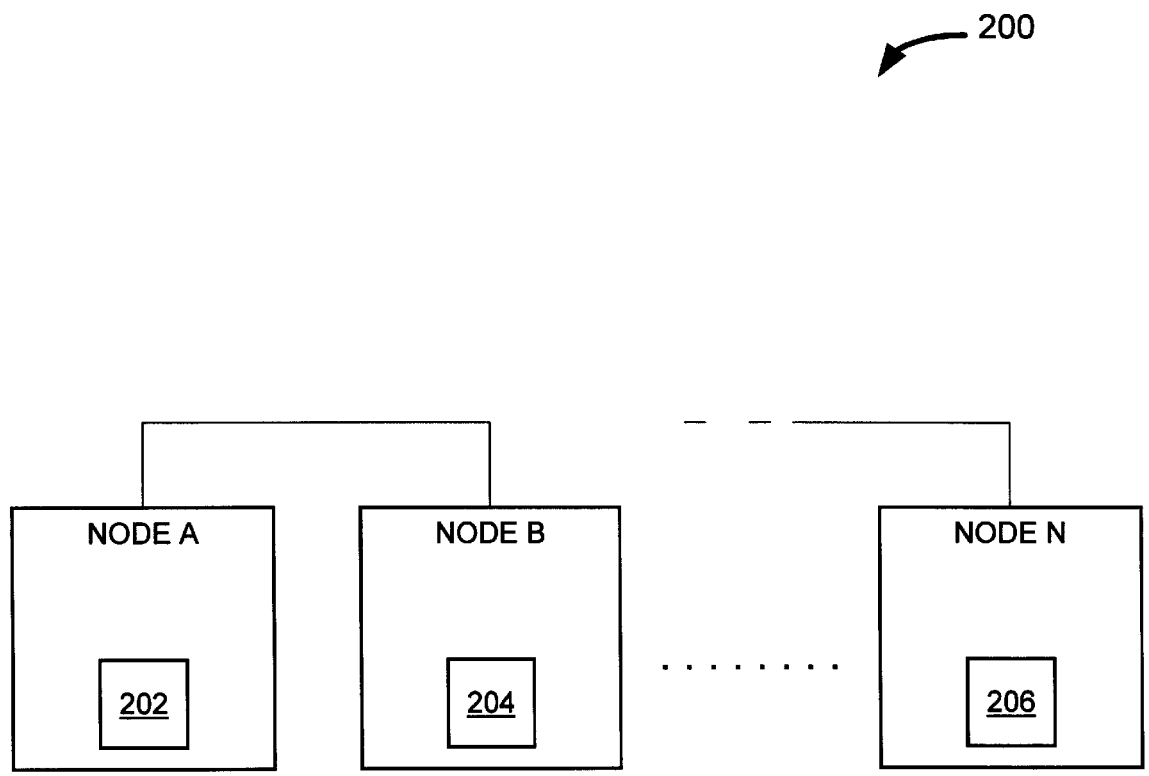
FIG. 2A illustrates an exemplary enhanced clustered computing system in accordance with one embodiment of the present invention.

FIG. 2A illustrates an exemplary enhanced clustered computing system 200 in accordance with one embodiment of the present invention. The enhanced clustered computing system 200 includes at least two computing nodes (nodes), nodes A and B, and is configured for adding one or more additional nodes (e.g., an N$^{th}$ node) and/or peripheral devices such as storage devices, printers, scanners, cameras, etc. The nodes of the enhanced clustered computing system 200 form a computing cluster and behave as a cohesive logical unit. Accordingly, the enhanced clustered computing system 200 appears as a single entity to the clients (not shown) requesting services from the enhanced clustered computing system 200. In one embodiment, each of the nodes A, B and N of the clustered computing system 200 respectively includes an integrity protector 202, 204 and 206. Among other things, the integrity protectors 202–206 ensure that potential problems, such as partitions in time and partitions in space, do not arise to compromise the integrity of the enhanced clustered computing system 200 and its operations.

As discussed earlier in the background, a clustered computing system may be undesirably partitioned into two or more sub-clusters that may be formed in time or space. In such situations, the integrity of the clustered computing system may be compromised. In the case of a partition in space, at least two disjointed sub-clusters are formed and the sub-clusters are unable to communicate with each other. As will be discussed in detail below, when two or more disjointed sub-clusters are partitioned in space, the integrity protectors 202–206 ensure that integrity of the clustered computing system 200 is preserved. In addition, the integrity protectors 202–206 ensure that a partition in time does not occur when various configurations of the clustered computing system are or have been used at different times.

Figure 1:
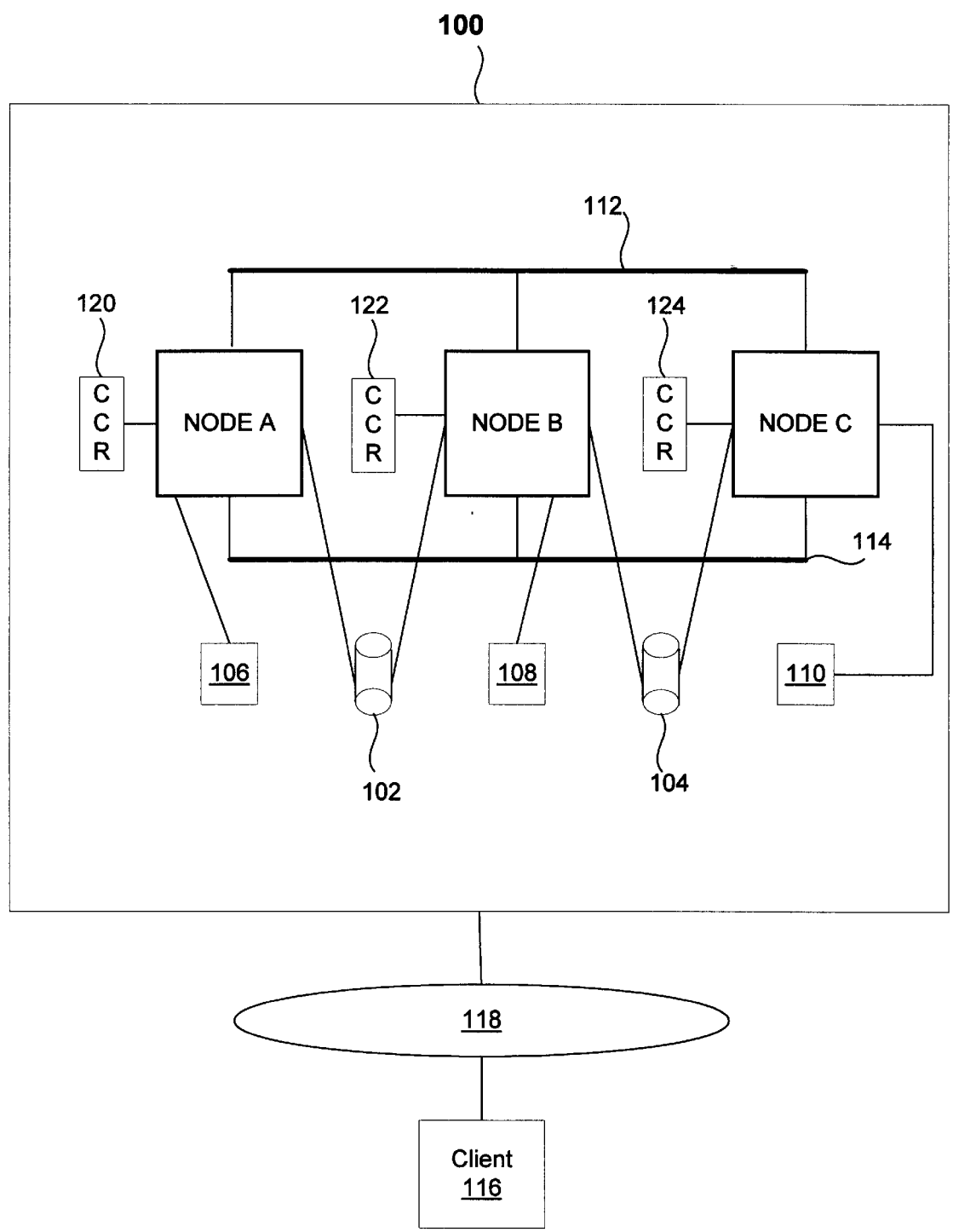
FIG. 1 illustrates a clustered computing system.

In cases when two disjointed sub-clusters are partitioned in space, the integrity protectors 202–206 of each of the nodes A, B and N ensure that at most one sub-cluster remains active. In one embodiment, the integrity protectors 202–206 initiate a "vote count" for the sub-clusters that are formed. As a result, those nodes within sub-clusters that do not represent a majority of a total number of votes available (total votes available) in the clustered computing system will be shut down. Since there can be at most one sub-cluster with a majority of the total votes available, at most one sub-cluster will remain active. In other words, the one sub-cluster that remains active represents at least a majority of the total votes available. To elaborate, each of the computing nodes A, B and N of the enhanced clustered computing system 200 shown in FIG. 1 can be assigned a vote. For example, each node can be assigned one vote so that the total number of votes is equal to the number of nodes in the enhanced clustered computing system 200.

As an example, consider the enhanced clustered computing system 200 to include only two nodes A and B (with no other nodes physically present). Also assume each node is assigned a single vote, such that a total number of two votes are available. In this example, if nodes A and B stop receiving each others activation signals, two disjointed sub-clusters will be formed, where each sub-cluster includes one node and each sub-cluster has only one vote. Since one vote does not constitute a majority of two (the total votes available), the integrity protectors 202 and 204 ensure that both sub-clusters (i.e., in this example, nodes A and B) initiate shut down of their nodes.

It should be noted that it is not necessary for each of the nodes of the enhanced clustered computing system 200 to have the same number of votes. For example, there may be a preference to have node A active over other nodes. Accordingly, node A may be assigned two votes and node B only one vote so that the total votes available is three votes. In this situation, if two disjointed sub-clusters are formed (one-sub cluster with node A and one sub-cluster with node B), the sub-cluster including node B will initiate shut down. However, the sub-cluster of node A will not initiate a shut down since it possesses a majority (i.e., 2 out of 3) of the total votes available.

Regardless of the arrangement of the enhanced clustered computing system 200, there can only be one sub-cluster with a majority of votes. The at most one sub-cluster with the majority of votes remains active while other sub-cluster (s) are shut down. Additionally, the sub-cluster remaining active can safely take over the services of those other sub-cluster(s) that have been shut down. In this way, the integrity protectors 202–206 which perform the vote counting and majority determination operations ensure that at most one sub-cluster remains active in cases where two or more disjointed sub-clusters are formed.

Figure 2B:
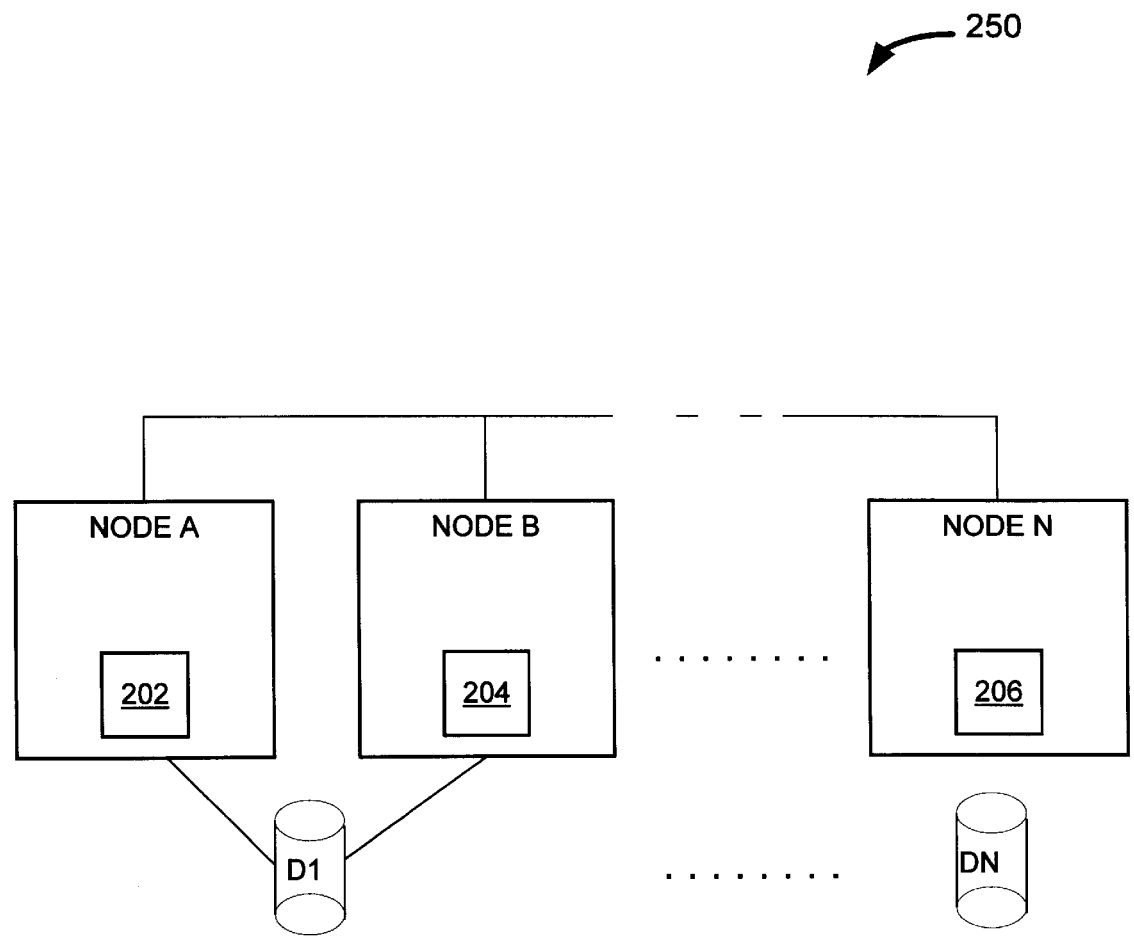
FIG. 2B illustrates an exemplary enhanced clustered computing system in accordance with another embodiment of the invention.

As noted earlier, a clustered computing system may also include other devices (e.g., peripheral devices) such as storage devices (e.g., storage disks), printers, scanners, cameras, etc. In accordance with one aspect of the invention, such devices can be assigned "proxy" votes that can be controlled by one or more nodes in the clustered computing system. Devices that can be assigned proxy votes can be referred to as "proxy devices". FIG. 2B illustrates an exemplary enhanced clustered computing system 250 in accordance with another embodiment of the invention. In addition to nodes A, B and N, the enhanced clustered computing system 250 can include one or more other devices (e.g., peripheral devices) such as a storage device D1 or DN. The storage device D1 may be shared by nodes A and B in a manner that it can be accessed by both nodes A and B. In one embodiment, storage devices D1 and DN are assigned (N−1) proxy votes, wherein N is the number of nodes that are configured to access the storage device. For example, storage device D1 would be assigned one proxy vote, since two nodes are configured to access it. However, it should be noted that devices may be assigned proxy votes in accordance with various other schemes. To elaborate by way of a simple example, consider the enhanced clustered computing system 250 (ABD1) to include only nodes A and B and storage device D1 (with no other nodes or devices physically present). In this case, if each node is assigned one vote and with one proxy vote being available from storage device D1, the total number of votes available for the enhanced clustered computing system 250 (ABD1) would be three. In this example, one proxy vote has the same value as a vote assigned to a node (node vote). Similar to the case discussed above, consider when two disjointed sub-clusters (A and B) are formed from the enhanced clustered computing system 250 (ABD1). In this situation, the integrity protectors 202–204 of sub-clusters A and B, respectively, would attempt to solicit the proxy votes of the storage device D1. In this simple case, since each sub-cluster has only one node, the integrity protectors 202–204 of nodes A and B, respectively, would solicit to acquire the proxy votes for storage device D1. However, it should be noted that if a sub-cluster includes more than one node, two or more nodes of a given sub-cluster may solicit the proxy vote of a device. Hence, the nodes soliciting the proxy votes may be nodes in the same sub-cluster or nodes in different (disjointed) sub-clusters. In any case, as will be discussed later, only one node can acquire the proxy vote associated with a "proxy device". Accordingly, in this example, the integrity protectors 202–204 determine that the node (or sub-cluster) that acquires the proxy votes of storage device D1 would have a total of two votes (one vote for the node itself and another proxy vote from the storage device D1). Since two votes represent a majority of the three total votes available in the enhanced clustered computing system 250 (ABD1) of this example, the integrity protectors 202–204 ensure that the node (or sub-cluster) that acquires the proxy vote will remain active. On the other hand, the node (or sub-cluster) that does not acquire the proxy vote will initiate a shut down.

As noted above, the integrity protectors 202–206 also ensure that partitions in time do not occur when various cluster configurations of a clustered computing system are or have been used at different times. This can be achieved by allowing startup of only those enhanced cluster configurations that possess at least a majority of the total number of votes available in the enhanced clustered computing system 200 or 250. It should be noted that partitions in time can occur in situations when cluster configurations that do not have any nodes in common are or have been used at different times. As will be appreciated by those skilled in the art, allowing startup of only the cluster configurations that possess a majority of total votes available can ensure that partitions in time do not occur. Cluster configurations that have at least a majority of votes have at least one node in common with a prior cluster configuration. Accordingly, partitions in time will not occur since having the at least one node in common assures that latest (up to date) version of configuration information is available in the enhanced clustered computing system. In one embodiment, when a cluster is started, the integrity protectors 202–206 will initiate a vote count to determine whether the cluster configuration has at least a majority of total votes available in the clustered computing system.

Although for illustrative purposes simplified situations and simplified clustered computing systems have been discussed, it should be noted that the integrity protectors likewise ensure the integrity of computing clustering systems when numerous computing nodes and/or devices are present. In more practical applications, it is possible that several sub-clusters with many computing nodes and/or devices in each sub-cluster are formed. In these cases, the invention operates so that at most one sub-cluster remains active. Accordingly, the integrity of the clustered computing system is preserved and the remaining one sub-cluster can safely take over the services of all other sub-clusters after they have been shut down.

Figure 3A:
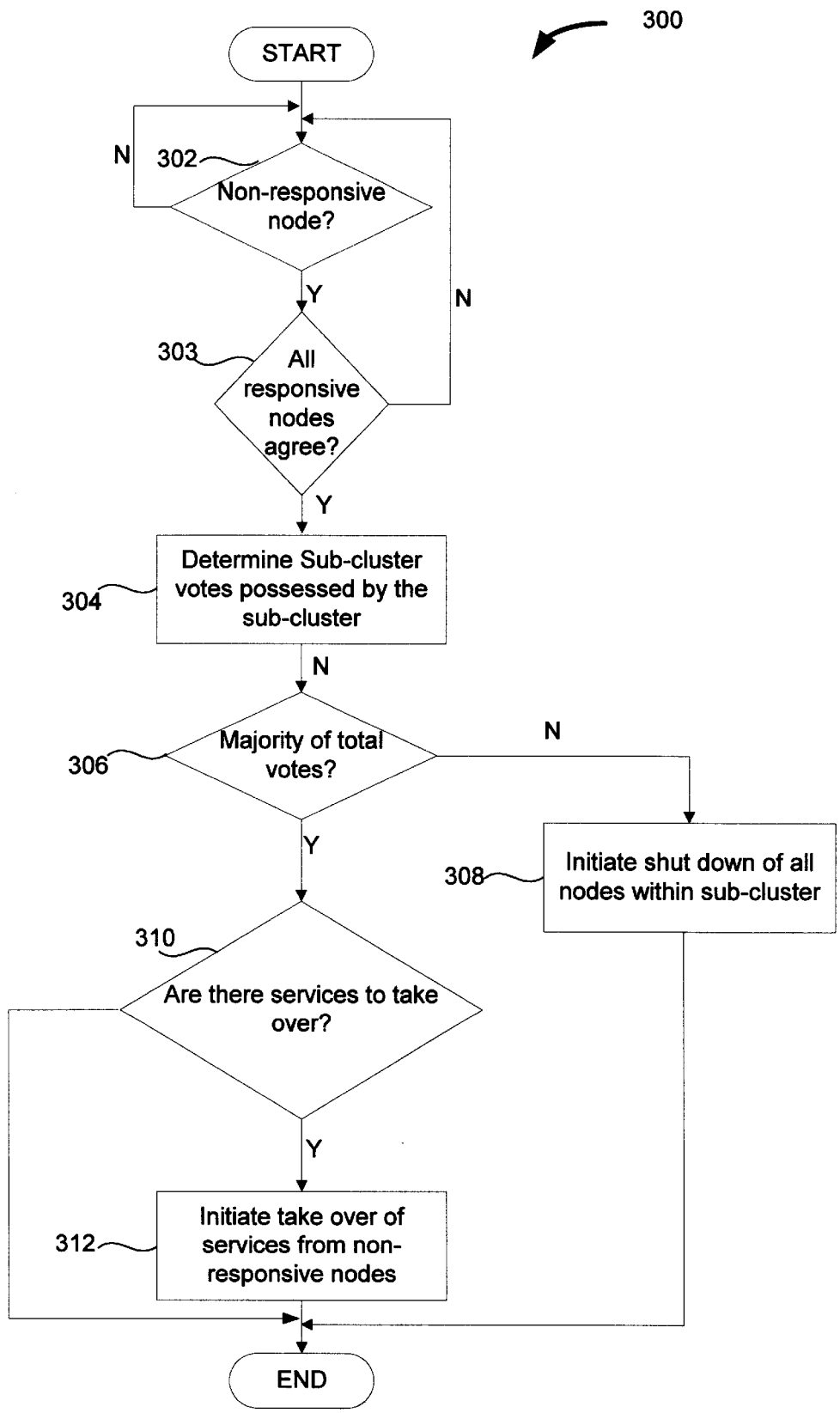
FIG. 3A illustrates an operational management method for managing operations of a clustered computing system in accordance with one embodiment of the invention.

FIG. 3A illustrates an operational management method 300 for managing operations of a clustered computing system in accordance with one embodiment of the invention. For example, the operational management method 300 can be implemented as series of operations that can be performed by the enhanced clustered computing system 200 and 250 discussed with respect to FIGS. 2A and 2B, respectively. In one implementation, the operational management method 300 can be performed by the integrity protectors 202–206 of the enhanced clustered computing system 200 and 250. Initially, at operation 302 a determination is made as to whether one of the nodes in the clustered computing system has become a non-responsive node with respect to another node (e.g., "a first node").

According to the operational management method 300, each node in the clustered computing system periodically sends all the other nodes an activation signal that indicates that the node is operational. These activation signals are periodically sent and received by each node. If a first node does not receive an activation signal from a second node within a pre-determined period of time, the second node can be said to have become non-responsive to the first node. Detection of a non-responsive node implies either a problem with the non-responsive node or the presence of other problems such as failure of communication channels. In any case, when one or more non-responsive nodes are detected by the first node, it is possible that at least two disjointed sub-clusters have been formed. One disjointed sub-cluster can include the first node together with all the nodes that still remain responsive to the first node (as well as remaining responsive to each other). It should be noted that in a sub-cluster all the nodes of the sub-cluster remain responsive to each other.

When a non-responsive node has been detected, the operational management method 300 proceeds to operation 303 where it is determined whether all the nodes responsive to the first node agree that the second node has become a non-responsive node. If at least one responsive node still receives responses from the second node, a (disjointed) sub-cluster that includes the second node has not been created. However, if all responsive nodes agree that the second node has become a non-responsive node, a sub-cluster that includes at least the first node has been detected and the operational management method 300 proceeds to operation 304.

At operation 304, the total number of votes possessed by the sub-cluster (the sub-cluster that includes the first node and all responsive nodes to the first node) is determined. Next, at operation 306 a determination is made as to whether the votes possessed by the sub-cluster is a majority of total number votes available in the clustered computing system. The total number of votes available can be a number that is determined based on the computing nodes and/or devices that are configured in the clustered computing system. If the number of votes possessed by the sub-cluster does not constitute a majority, then shut down of all nodes within the sub-cluster is initiated at operation 308. It should be noted that each node in the sub-cluster can initiate a self-shut down, in accordance with one embodiment of the present invention. On the other hand, if the number of votes possessed by the sub-cluster represents a majority of the total number of votes available, the operational management method 300 proceeds to operation 310 where a decision is made to determine whether any of the services need to be taken over from the non-responsive nodes.

As discussed earlier, at most one sub-cluster can possess a majority of total votes in the clustered computing system. Accordingly, if any of the services provided by non-responsive nodes need to be taken over, take over of services from non-responsive nodes can be initiated by the sub-cluster having the majority of total votes in the clustered computing system, as noted in operation 312. Otherwise, if there are no services to be taken over, the operational management method 300 bypasses operation 312. Following operations 308 and 312, as well as operation 310 when no services are to be taken over, the operational management method 300 ends.

Figure 3B:
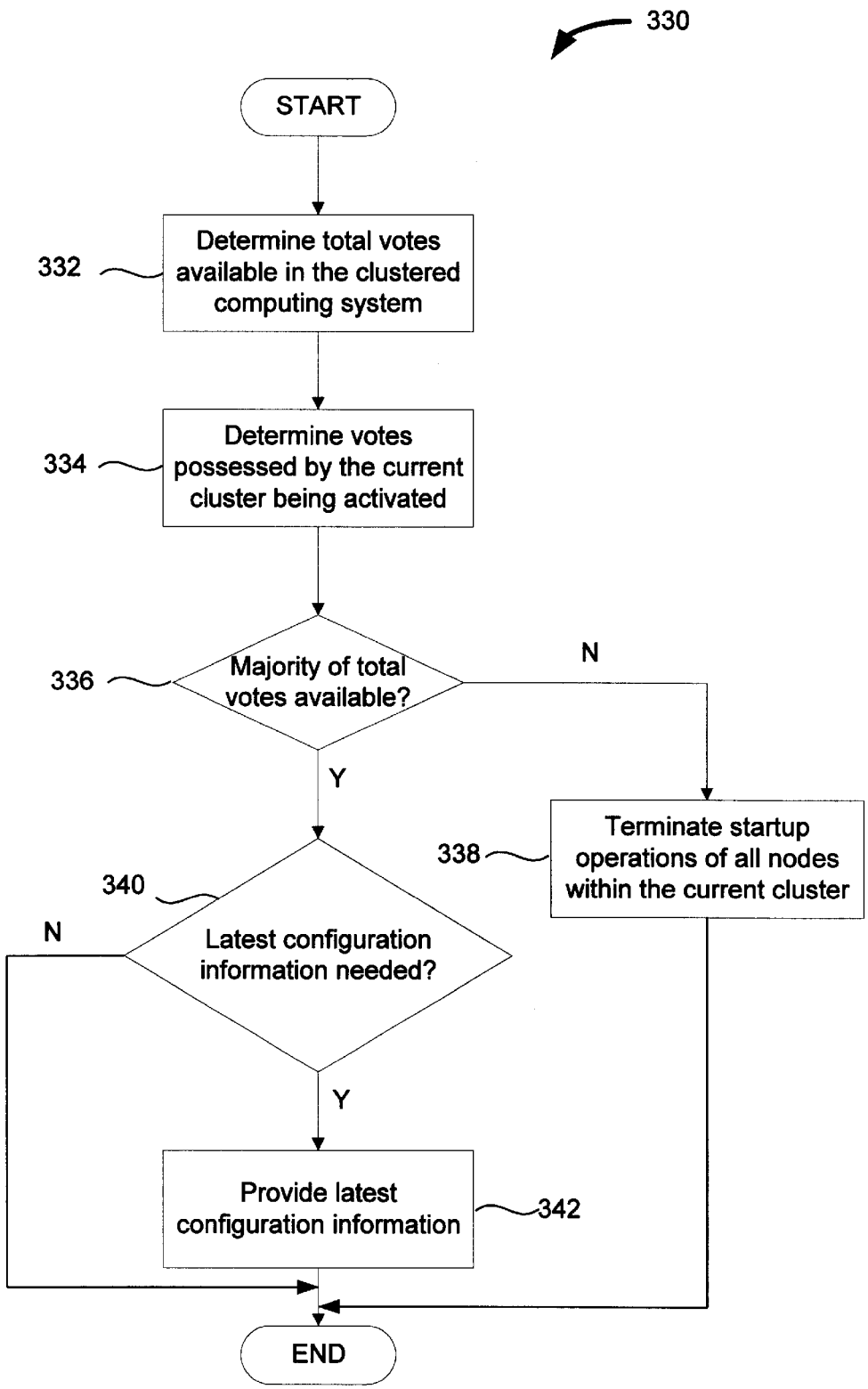
FIG. 3B illustrates an operational management method for starting up a computing cluster in accordance with another embodiment of the present invention.

FIG. 3B illustrates an operational management method 330 for initial start up a computing cluster in accordance with another embodiment of the present invention. For example, the operational management method 330 can be implemented as a series of operations that can be performed by the nodes of the enhanced clustered computing systems 200 and 250 of FIGS. 2A and 2B. In one implementation, the operational management method 330 can be performed by the integrity protectors 202–206 of the enhanced clustered computing system 200 and 250. Initially, at operation 332, the total number of votes available in the clustered computing system is determined. In addition, for the computing cluster being started up (i.e., activated)(also referred to as current cluster), the number of votes possessed by the current cluster is determined at operation 334.

Next, at operation 336 a determination is made as to whether the current cluster possesses at least a majority of the total votes available in the clustered computing system. If the current cluster does not possess at least a majority of total votes available, startup operation of all nodes within the current cluster is terminated at operation 338. However, if the current cluster possess at least a majority of the total number of votes available, operational management method 330 proceeds to operation 340 where a determination is made as to whether the latest configuration information needs to be provided to one or more nodes. Since the current cluster has at least a majority of total number of votes there is at least one node in the current cluster that has the latest information. Accordingly, if the latest configuration information needs to be provided to one or more other nodes, the latest configuration information can be provided at operation 342. After operation 342 has been performed or bypassed, the operational method 330 ends. The operational method 330 also ends following operation 338. It should be noted that after the operational method 330 ends, other operations, including other startup operations, can be initiated. For example, in one embodiment, appropriate identifiers (e.g., reservation keys) can be placed on one or more proxy devices. These identifiers can identify those nodes of the clustered computing system which are entitled to access (e.g., write to) the proxy devices.

Figure 3C:
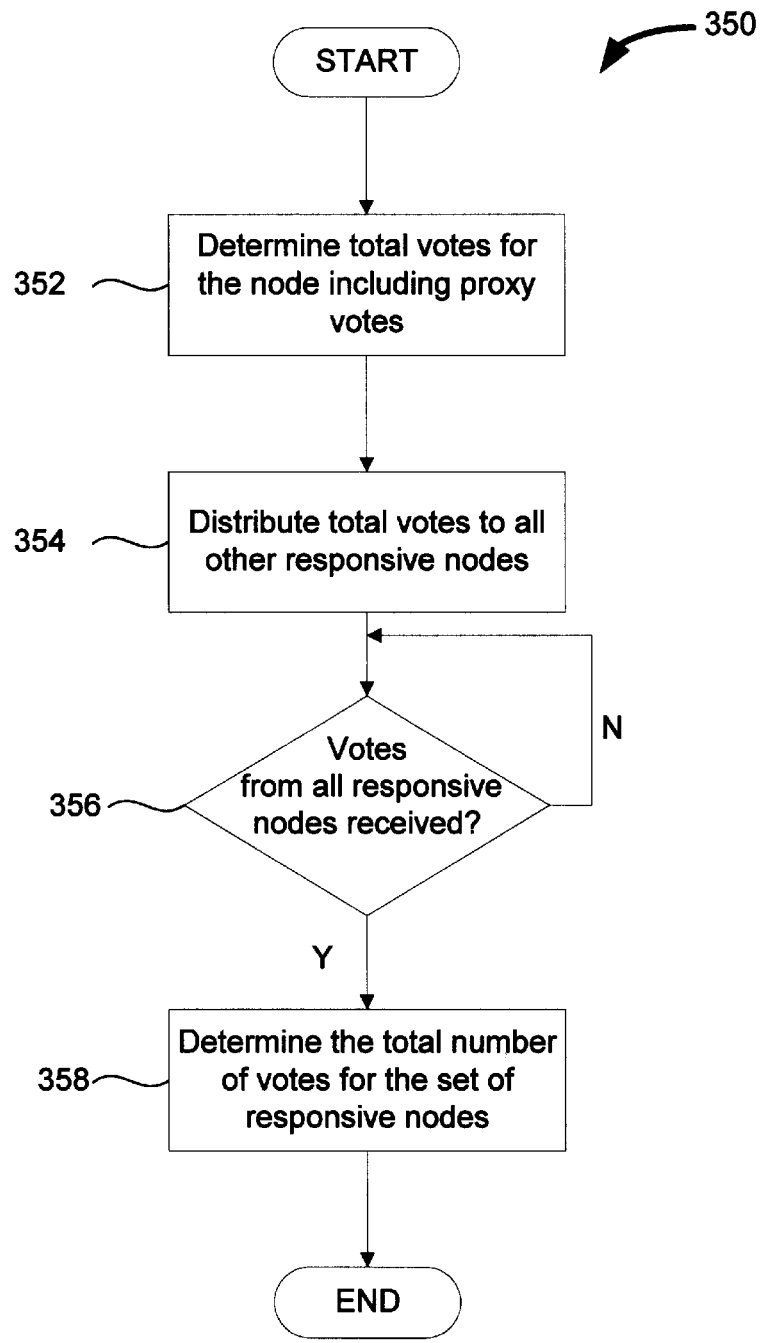
FIG. 3C illustrates a vote counting method for determining the number of total votes possessed by a group of nodes that are responsive to each other in accordance with one embodiment of the present invention.

FIG. 3C illustrates a vote counting method 350 in accordance with one embodiment of the present invention. The vote counting method 350 determines the number of total votes possessed by a group of nodes that are responsive to each other. For example, the vote counting method 350 represents operations that can be performed in determining the votes possessed by a sub-cluster or a current cluster, as discussed with respect to operation 304 of FIG. 3A and operation 334 of FIG. 3B. It should be noted that the vote counting method 350 can be performed by each node in a computing cluster or sub-cluster. In one implementation, the vote counting method 350 can be performed by the integrity protectors 202–206 of the enhanced clustered computing system 200 and 250. Initially, at operation 352, a node calculates the total number of votes that it possesses (including any proxy votes that the node has acquired). Next, at operation 354, the node distributes the total number of votes it possesses to all the other nodes that are (or remain) responsive to the node (i.e., to other nodes in its cluster or sub-cluster). The vote counting method 350 then proceeds to operation 356 where a determination is made as to whether the node has received the total number of votes possessed by each of the other nodes that are (or remain) responsive to the node. Once all the total number of votes for the responsive nodes have been received, the vote count method 350 proceeds to operation 358 where the total number of votes for the set of responsive nodes in the sub-cluster or cluster (total votes) is calculated. This can be achieved by adding all the votes reported by other nodes to votes possessed by the node itself. In this way, each node can determine the total votes possessed in the sub-cluster or cluster of nodes.

Figure 4A:
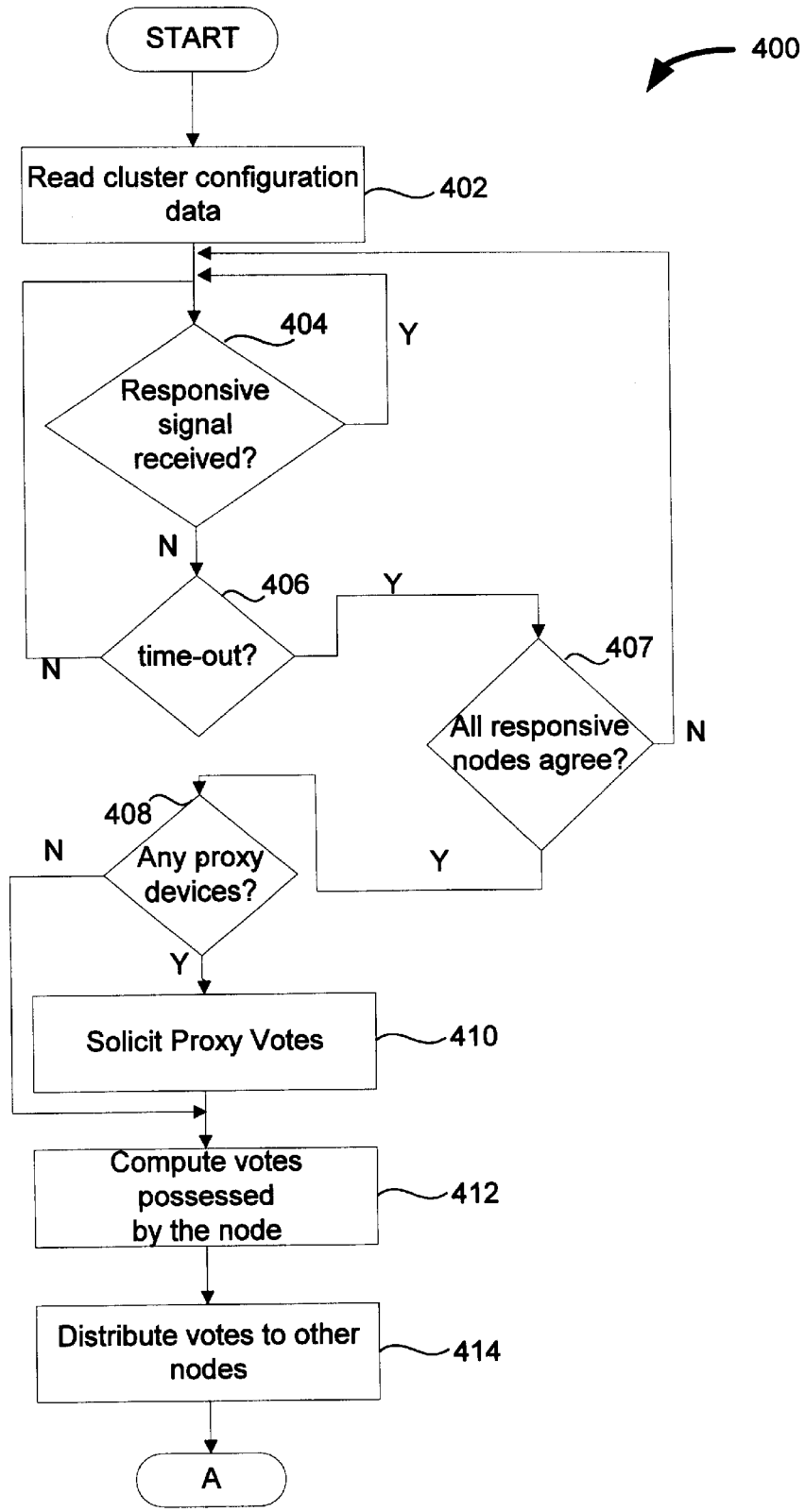
FIGS. 4A–B illustrate a vote counting method, in accordance with another embodiment of the invention.

FIG. 4A illustrates a vote counting method 400 in accordance with another embodiment of the invention. The vote counting method 400 represents a more detailed embodiment of the vote counting method 350 illustrated in FIG. 3C. For example, the vote counting method 400 represents operations that can be performed in determining the votes possessed by a sub-cluster or a current cluster, as discussed with respect to operation 304 of FIG. 3A and operation 334 of FIG. 3B. It should be noted that the vote counting method 400 can be performed by each of the nodes in a computing cluster or sub-cluster. Initially, at operation 402, configuration data is read by a node to ascertain configuration information about other nodes that are configured to respond to the node (e.g., by sending activation signals). In other words, the configuration data informs the node of the other nodes within the cluster or sub-cluster. After it has been determined what nodes should be responding, a determination is made as to whether responsive signals have been received from all the nodes that are expected to respond at operation 404. If a responsive signal (e.g., activation signal) is not received after a predetermined time provided by a time-out determination at operation 406, the presence of at least one non-responsive node has been detected. Next, at operation 407 a determination is made as to whether all the responsive nodes agree that a non-responsive node has been detected.

Figure 4B:
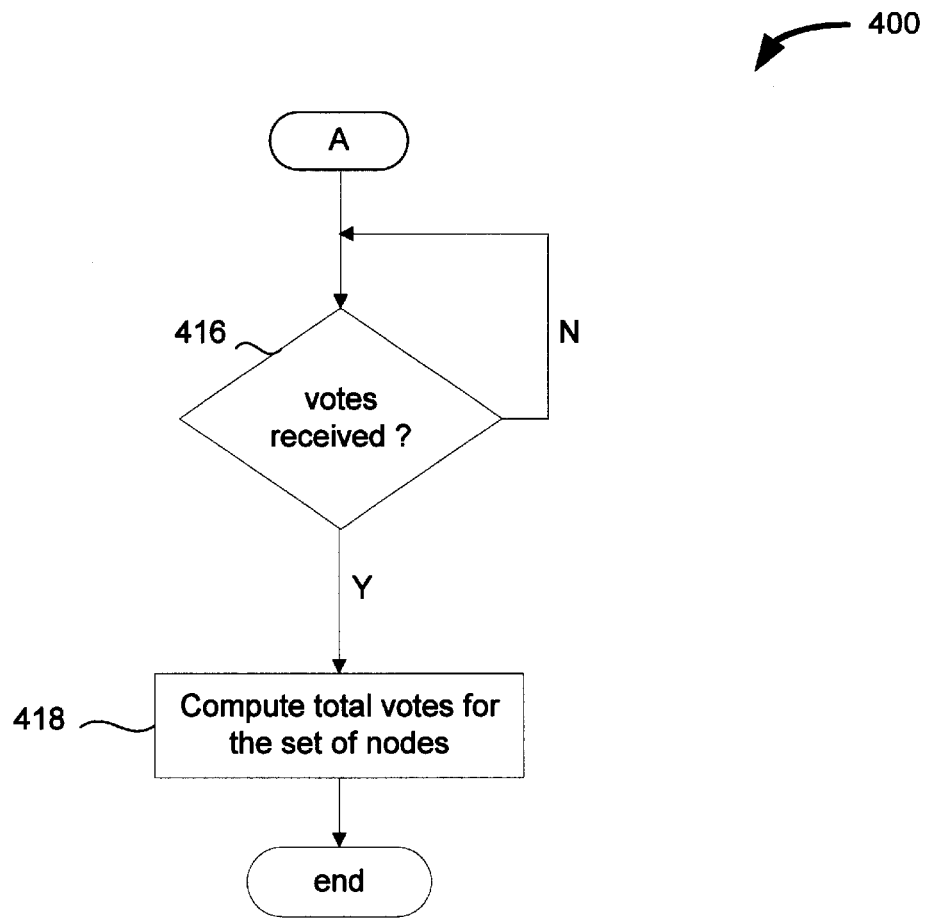

If all responsive nodes agree that a non-responsive node is present, the vote counting method 400 proceeds to operation 408 where a determination is made as to whether any proxy devices have been configured for the node. If there is at least one proxy device configured for the node, the vote counting method 400 solicits proxy votes from all the proxy devices that are configured for the node at operation 410. Here, the proxy devices configured for the node are those devices that the node can normally access or otherwise utilize. If there is not at least one proxy device configured for the node, the vote counting method 400 proceeds directly to operation 412 and bypasses operation 412. In any case, the total number of votes possessed by the node is calculated at operation 412. It should be noted that the total number of votes possessed by a node also reflects any proxy votes that may have been acquired as a result of soliciting of proxy votes in operation 410. The total number of votes possessed by the node is then distributed to all other nodes at operation 414. Next, at operation 416 (shown in FIG. 4B) a determination is made as to whether the number of votes possessed by all other responsive nodes have been received. It should be noted that each node reports to all the other responding nodes the total number of votes that it possesses. When all the other responsive nodes have reported their vote counts and these vote counts have been received by the node, the vote counting method 400 can proceed to operation 418 where the total number of votes for the set of responsive nodes (i.e., cluster or sub-cluster) is determined. This can be achieved by adding the votes reported by other responsive nodes to the votes possessed by the node itself. It should be noted that the total number of votes determined in operation 418 represents the total number of votes possessed by the sub-cluster or cluster (i.e., total votes). In any case, the number of total votes determined at operation 418 can be used to determine whether a node can remain active or should be shut down, as described above with respect to operational management methods 300 and 330 of FIG. 3A and 3B, respectively.

Figure 4C:
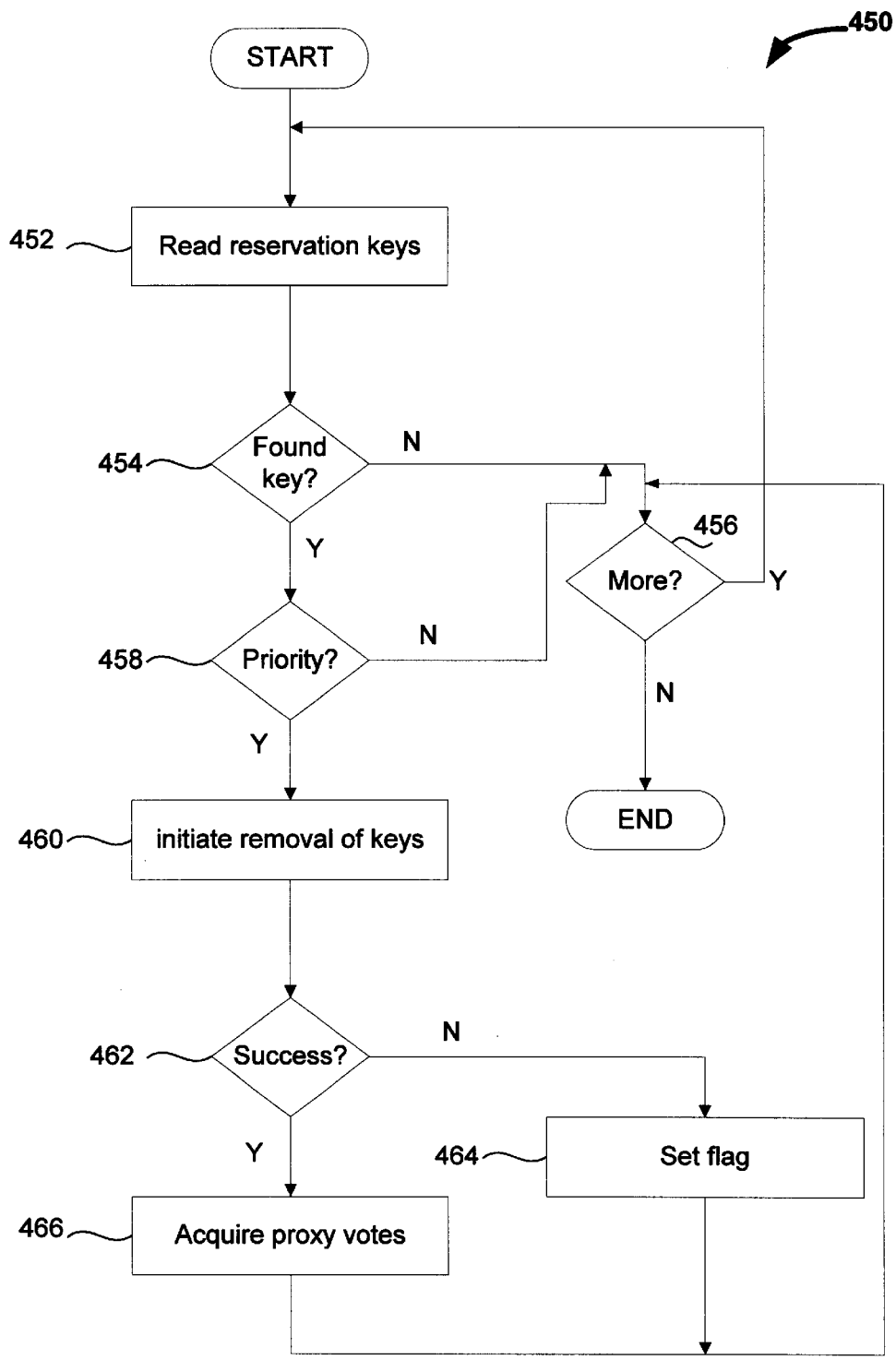
FIG. 4C illustrates a method for soliciting proxy votes from proxy devices in accordance with a preferred embodiment of the invention.

FIG. 4C illustrates a method 450 for soliciting proxy votes from proxy devices in accordance with a preferred embodiment of the invention. A node can be configured to access a proxy device, for example, a storage device such as storage disk D1 as discussed above with respect to FIG. 2B. More particularly, the method 450 represents one embodiment of the operation 410 of FIG. 4A. The method 450 can be implemented as a series of operations that are performed by nodes in a clustered computing system. As will be appreciated by those skilled in the art, the method 450 can be implemented to take advantage of some of the recently developed features of the SCSI-3 protocol (e.g., Persistent Group Reservations).

Initially, at operation 452, a node accesses the proxy device to read the reservation keys that are resident on the device in accordance with the SCSI-3 protocol. Generally, any identifier such as key can be used to identify a node. However, in this embodiment, SCSI-3 reservation keys are used. A SCSI-3 reservation key is an 8-byte identifier that can be placed on the proxy devices. Accordingly, the reservation keys placed on a proxy device identify the nodes with permission to write to the proxy device.

Next, at operation 454 the node searches the SCSI-3 reservation keys on the device to determine whether its own reservation key is on the device. In other words, a determination is made as to whether the node has permission to acquire the proxy votes of the device. If the node does not find its own key on the device, a determination is made as to whether other devices are configured for the node at operation 456. If no other devices are configured, there is no need to solicit more proxy votes and the method 450 terminates. If there are more devices configured, the method 450 proceeds back to the operation 452 where the reservation keys of the next configured device to be processed are read. Alternatively, when the node finds its own key among the reservation keys for the device, the method 450 proceeds to an operation 458 where a determination is made as to whether the key for the node is a reservation key having appropriate priority, e.g., a priority number that can take precedence over one or more other priority numbers. In one embodiment, the lowest numbered node is given the highest priority. As noted earlier, only one node can possess the proxy votes of a proxy device. If the key for the node does not have the appropriate priority, the method 450 proceeds back to the operation 456 to determine if there are any other proxy devices to be processed.

On the other hand, if it is determined at operation 458 that the key for the node has the appropriate priority, the method 450 proceeds to operation 460 where the removal of reservation keys of all non-responsive nodes with access to the proxy device is initiated. Next, at operation 462, a determination is made as to whether the operation 460 was successfully performed. If the removal of the reservation keys fails, a preemptive flag can be set at operation 464 to indicate that there has been a failure in acquiring the proxy votes. A failure in removal of the reservation keys implies that the proxy device has been acquired by one of the non-responsive nodes. However, if the removal of reservation keys is successful, the method 450 proceeds to operation 466 where the proxy votes for the device are acquired by the node. The method 450 can next proceed back to operation 456 to determine if there are more devices to be processed.

Additional details on SCSI-3 can be found in SCSI-3 Primary Commands (SPC), ANSI X3.301 which is hereby incorporated by reference.

The invention has numerous advantages. One advantage is that the invention provides greater and more reliable protection against partitions in time or space which are unwanted conditions in clustered computing systems. Another advantage is that the invention protects the integrity of clustered computing systems without requiring any amount of human intervention as required by conventional solutions. Still another advantage is that the techniques of the invention can be implemented as an integral solution to avoid a wide variety of potential problems (including split brain and amnesia) that may occur in operations of clustered computing systems. Yet another advantage is that cost effective and not overly complicated implementations are possible.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for managing operation of a clustered computing system, the clustered computing system including at least a cluster of computing nodes and at least one peripheral device, wherein said clustered computing system is configured to interact with a user as a single entity, said method comprising:

(a) determining whether one or more of the computing nodes in the cluster have become one or more non-responsive nodes;

(b) determining a sub-cluster vote for a sub-cluster of one or more responsive computing nodes, wherein the sub-cluster represents a portion of the cluster that remains responsive;

(c) obtaining a total votes for the clustered computing system;

(d) determining whether the sub-cluster vote is at least a majority of the total votes;

(e) initiating shut down of the one or more computing nodes within the sub-cluster when said determining (d) determines that the sub-cluster vote is not at least a majority of the total votes; and wherein said determining of sub-cluster vote includes soliciting a proxy vote from the at least one device using a reservation key.

2. A method as recited in claim 1, wherein the (a) determining comprises:
   (a1) detecting that a computing node in the cluster that has become non-responsive with respect to a first computing node; and
   (a2) determining whether all responsive nodes to the first computing node agree that the computing node detected in detecting (a1) has become non-responsive.

3. A method as recited in claim 1, wherein the method further comprises:
   (f) taking over services from at least one of the non-responsive nodes by at least one of computing nodes in the sub-cluster when said determining (d) determines that the sub-cluster vote is at least a majority of the total votes.

4. A method as recited in claim 1, wherein said determining (d) of the sub-cluster vote comprises:
   (d1) identifying the computing nodes within the sub-cluster; and
   (d2) summing node votes for each of the computing nodes within the sub-cluster to obtain the sub-cluster vote.

5. A method as recited in claim 1,
   wherein the computing nodes of the sub-cluster are assigned a node vote, and
   wherein said determining (d) of the sub-cluster vote comprises summing the node votes for the computing nodes of the sub-cluster.

6. A method as recited in claim 5, wherein the node vote is an integer equal to or greater than 1.

7. A method as recited in claim 1,
   wherein the computing nodes in the sub-cluster are assigned a node vote,
   wherein the clustered computing system includes at least one peripheral device that is assigned a proxy vote such that at least one of the computing nodes in the sub-cluster is capable of soliciting the proxy vote, and
   wherein said determining (d) of the sub-cluster vote comprises summing the node votes for the computing nodes of the sub-cluster and the proxy vote if acquired by one of the computing nodes of the sub-cluster.

8. A method as recited in claim 7, wherein the proxy vote assigned to the at least one device is a number (N−1), where N is the number of nodes that can solicit the proxy vote.

9. A method as recited in claim 1, wherein said determining (d) of the sub-cluster vote comprises:
   (d1) determining a first number of votes for a first computing node in the sub-cluster;
   (d2) distributing the first number of votes to each of the other computing nodes in the sub-cluster;
   (d3) receiving a second number of votes from a second computing node in the sub-cluster; and
   (d4) adding the first number of votes to the second number of votes.

10. A method as recited in claim 9, wherein the clustered computing system includes at least one device that is assigned a proxy vote, and
    wherein the computing nodes in the sub-cluster are assigned a node vote, and
    wherein said determining (d1) the first number of votes comprises:
       determining whether the proxy vote of the device can be solicited by the first computing node;
       soliciting the proxy vote when said determining whether a proxy vote can be solicited by the first computing node determines that at least one proxy vote can be solicited by the first computing node;
       acquiring the proxy vote by the first computing node when said soliciting has been successful; and
       adding the proxy vote to the node vote assigned to the first computing node when the proxy vote has been acquired by the first computing node.

11. A method as recited in claim 10, wherein said determining whether a proxy vote can be solicited by the first computing node comprises reading configuration information to determine whether the device associated with the proxy vote is configured for access by the first computing node.

12. A method as recited in claim 11, wherein said soliciting of the proxy vote comprises:
    reading a reservation key associated with the device associated with the proxy vote; and
    determining whether the first computing node has permission to solicit the proxy vote based on the reservation key.

13. A method as recited in claim 12, wherein said acquiring of the proxy vote comprises modifying the proxy information to disallow other computing nodes from acquiring the proxy vote when the proxy vote has been successfully acquired by the first computing node.

14. A method as recited in claim 10, wherein said determining (d1) the first number of votes further comprises:
    preventing other ones of the computing nodes of the sub-cluster from acquiring of the proxy vote when the proxy vote has been successfully acquired by the first computing node.

15. A method for managing startup operations of a cluster of computing nodes in a clustered computing system including at least one peripheral device, said method comprising:
    (a) determining a cluster vote for the cluster with each node being assigned a node vote and each at least one peripheral device being assigned a proxy vote and wherein the cluster vote includes the node votes and proxy votes associated with the cluster,
    (b) obtaining a total votes for the clustered computing system wherein the total votes include each node vote and each proxy vote in the clustered computing system;
    (c) determining whether the cluster vote is at least a majority of the total votes; and
    (d) initiating shut down of the computing nodes within the cluster when said (c) determining determines that the cluster vote is not at least a majority of the total votes.

16. A method as recited in claim 15, wherein the method further comprises:
    (e) determining whether configuration information needs to be provided to at least one computing node; and
    (f) providing the configuration information to the at least one node when the determining (e) determines that configuration information needs to be provided.

17. A clustered computing system, comprising:
    a cluster of computing nodes having at least two computing nodes and at least one peripheral device, with each node being assigned a node vote and said at least one peripheral device being assigned a proxy vote; and
    an integrity protector provided on each one of the computing nodes, the integrity protector determining a vote count for a set of computing nodes in the cluster, the set of nodes representing at least a portion of the cluster, and the integrity protector determining whether the set of computing nodes should be shut down based on the vote count.

18. A clustered computing system as recited in claim 17, wherein the integrity protector initiates shut down of the set of computing nodes when the vote count is not at least a majority of a total vote, the total vote representing the total votes available in the clustered computing system.

19. A clustered computing system as recited in claim 18, wherein the services of the set of computing nodes are taken over by one or more other computing nodes when the vote count is not at least a majority of the total vote.

20. A clustered computing system as recited in claim 17, wherein the clustered computing system further comprises:

a proxy device, the proxy device being assigned a proxy vote which is capable of being acquired by the integrity protector.

21. A clustered computing system as recited in claim 20, wherein the integrity protector solicits the proxy vote.

22. A clustered computing system as recited in claim 21,
wherein the integrity protector acquires the proxy vote, and
wherein the proxy vote acquired is used to determine the vote count.

23. A clustered computing system as recited in claim 22, wherein integrity protector prevents the proxy vote from being acquired when the proxy vote is acquired by the integrity protector.

24. A clustered computing system as recited in claim 20, wherein the integrity protector utilizes a SCSI-3 protocol.

25. A clustered computing system as recited in claim 17, wherein the integrity protector prevents partitions in space and partitions in time.

26. A computer readable media including computer program code for managing operation of a clustered computing system, the clustered computing system including at least one cluster of computing nodes and a peripheral device, said computer readable media comprising:

computer program code for determining whether one of the computing nodes in the cluster has become a non-responsive node in a non-responsive sub-cluster;

computer program code for determining a sub-cluster vote for a sub-cluster wherein the sub-cluster votes include votes for said computing nodes and said peripheral device, wherein the sub-cluster representing a portion of the cluster that remains responsive;

computer program code for obtaining a total votes for said clustered computing system, wherein the total votes include votes for the computing nodes and said peripheral device;

computer program code for determining whether the sub-cluster vote is at least a majority of the total votes; and computer program code for initiating shut down of the computing nodes within the sub-cluster when said computer program code for determining whether the sub-cluster vote is at least a majority of the total votes determines that the sub-cluster vote is not at least a majority of total votes.

27. A computer readable media as recited in claim 26, wherein said computer readable media further comprises:

computer program code for taking over services from the non-responsive node by at least one of computing nodes in the sub-cluster when said computer program code for determining whether the sub-cluster vote is at least a majority of the total votes determines that the sub-cluster vote is at least a majority of the total votes.

28. A computer readable media as recited in claim 27, wherein said computer program code for determining of the sub-cluster vote comprises:

computer program code for determining the computing nodes within the sub-cluster; and computer program code for summing node votes for each of the computing devices within the sub-cluster to obtain the sub-cluster vote.

* * * * *